Oct. 22, 1940.        P. HIRSCH        2,219,266
HOSE AND PIPE COUPLING
Filed Nov. 9, 1939
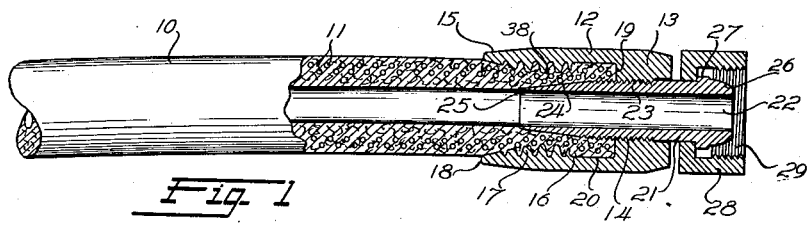
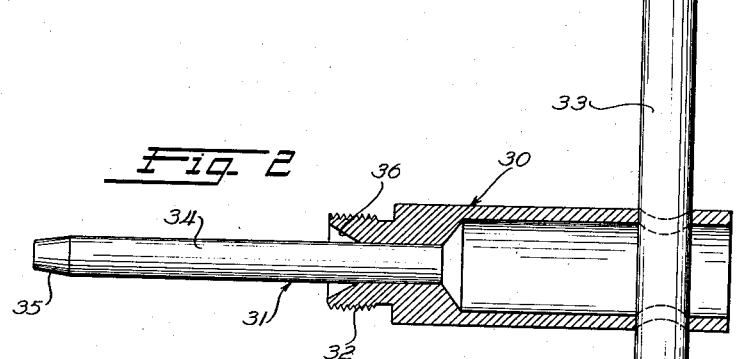
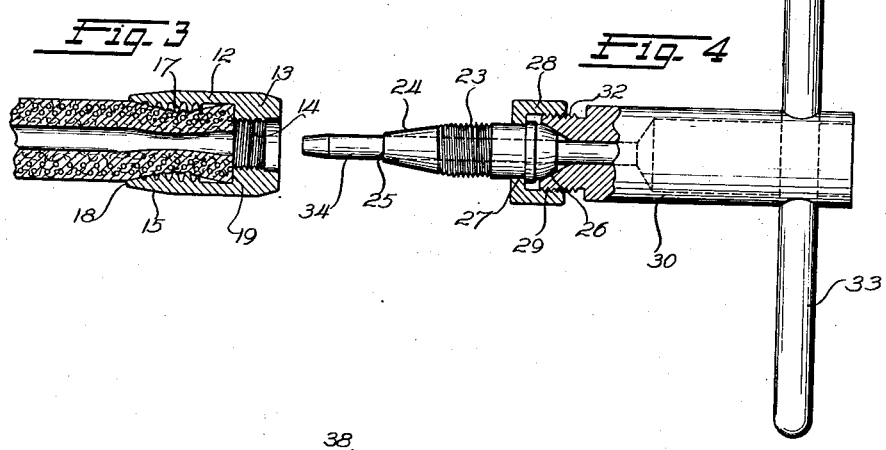
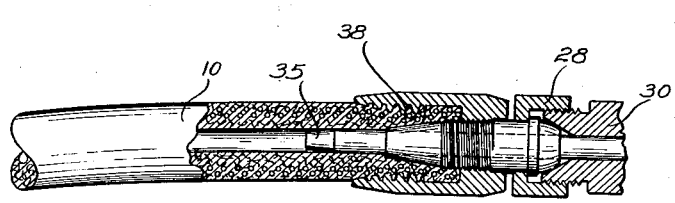
Inventor
Peter Hirsch
By Strauch & Hoffman
Attorneys Patented Oct. 22, 1940

2,219,266

UNITED STATES PATENT OFFICE 2,219,266

HOSE AND PIPE COUPLING

Peter Hirsch, New York, N. Y., assignor to Michigan Patents Corporation, Jackson, Mich.

Application November 9, 1939, Serial No. 303,711

1 Claim. (Cl. 285—86)

The present invention relates to hose and pipe couplings. More particularly, the invention is concerned with a hose and pipe coupling intended for use in systems in which the hose and pipe carry fluids under high pressures.

Great difficulty has been had in the past in providing a coupling between a hose section and a pipe section that will withstand high pressures and successfully resist flexure of the hose at the coupling under the severe conditions frequently encountered in practice. In order to withstand high pressures, it is necessary that hoses be constructed in such a way that expansion or enlargement of the hose will not occur when subjected to said pressures, because, as will be obvious, when the hose carries fluids used in power transmission or the like, any expansion of the hose would affect the behavior of the fluid passing therethrough. High pressure hoses, accordingly, are constructed of relatively stiff fibrous material. Frequently the hose walls include steel reinforcements, in the interior thereof, of various kinds. The inability of any portion of the hose to expand accordingly makes it impracticable to utilize any coupling contemplating an enlargement of the hose end by an expansion thereof.

The principal purpose of the present invention is to provide a hose and pipe coupling that is so designed that a union between the pipe and hose may be conveniently brought about by compressing the end of the hose between a socket and nipple shaped to adequately grip and hold the hose in such a manner that normal flexure of the hose at the coupling under the most severe conditions of service can occur without weakening the union, though the connection provided between the hose and pipe is such that failure in the fluid carrying system will occur, if at all, at other points before failure will take place at or adjacent the coupling or union.

A still further object of the invention is to provide a hose coupling including cooperating socket and nipple elements having their clamping surfaces formed to compress the fibrous material of the wall of the hose between them without expanding the end of the hose to the end that the coupling is affected by a compacting of the fibrous material of the hose, such compacting of said material preserving the strength of the hose end at the portion at which the coupling is applied thereto.

Still another object of the invention is to provide a hose coupling having socket and nipple elements designed to compress the end of the hose between them and having cooperating, clamping surfaces shaped to bite into the fibrous material of the hose and clamp it with the maximum pressure at a point spaced substantially inwardly of the edge of the end of the socket.

A still further object of the invention is to provide an improved method of applying a coupling to the hose, by which the socket element is first screwed on the hose end and the nipple then inserted into the bore of the hose from the end thereof, so as to compress the fibrous wall of the hose adjacent the end into engagement with a rib providing a thread on the inside wall of the socket.

Still further objects of the invention will appear as the description thereof proceeds with reference to the accompanying drawing in which:

Figure 1 is a longitudinal section through a hose coupling including the present invention;

Figure 2 is a longitudinal section through a tool well adapted for assembling the socket and nipple in accordance with the method of the present invention;

Figure 3 is a sectional view showing the socket applied to the hose end in accordance with the first step of the improved method;

Figure 4 is a longitudinal sectional view showing how the tool of Figure 2 is used in applying the nipple; and Figure 5 is a longitudinal sectional view showing the position of the tool after the coupling has been applied to the hose.

Like reference characters indicate like parts throughout the several figures.

Referring to Figure 1 of the drawing, 10 designates a hose designed to withstand high pressure. The present invention is capable of use in providing a coupling for a hose subjected to pressures up to 5000 pounds per square inch and in hoses varying in internal diameter from ⅛ of an inch to 3 inches. The hose 10 may be constructed of material customarily used in the manufacture of high pressure hoses, such as braided or woven fibrous material reinforced by a steel reinforcement 11, for example. Or the hose may consist of a number of plies of compressible, fibrous material with or without steel reinforcement, the structure of the hose constituting no part of the present invention. Hoses capable of withstanding pressures of the order of that already referred to cannot be expanded at their ends in applying a coupling thereto, but the fibrous material forming a part of the hose wall though relatively unyielding, is capable of being compressed under substantial pressure to a substantial degree in the application of the coupling and use is made of this characteristic of high pressure hoses in the present invention.

The hose coupling consists of a socket 12, the body portion 13 of which is internally threaded at 14 for interengagement with the nipple of the coupling. The end portion 15 of the socket is provided with a bore 16, the maximum internal diameter of which corresponds to the outside diameter of the hose 10. Projecting inwardly from the wall of the bore 16 is a spiral rib 17. The spiral rib has a maximum height at a point spaced substantially inwardly from the edge 18 of the end 15 of the socket as illustrated in the drawing, the height of the spiral rib 17 diminishing from the point of maximum height in both directions. Preferably, the spiral rib 17 terminates at a point substantially spaced from the end wall 19 of the socket, providing a recess 20 inwardly of the rib 17 for a purpose presently to be stated.

Cooperating with the socket 12 is a nipple 21 provided with a bore 22, preferably of uniform diameter from end to end of the nipple. It is also preferred that the bore of the nipple be formed of a diameter corresponding to the interior diameter of the hose for which the nipple is intended, so that, after the nipple is in final position, a passage of uniform diameter will be provided through the hose and nipple. The nipple 21 has an externally threaded body portion 23, a tapered end portion 24, the taper of which is so formed as to provide a thin end edge 25. The other end of the nipple 21 is provided with a sealing surface 26 of appropriate form for cooperation with a matching sealing surface on the pipe to which the hose is to be connected by the coupling constituting the present invention. The nipple also is provided with an annular shoulder 27 adjacent the sealing surface 26. A cap nut 28 having internal threads 29 for engagement with the threaded end of the pipe (not shown) is telescoped on the nipple from the end opposite from that which contains the sealing surface and abuts against the shoulder portion 27 as illustrated.

A coupling consisting of the socket, nipple and cap nut such as just described, may be conveniently assembled in the field by means of a tool such as illustrated in Figure 2 of the drawing. The tool consists of a body portion 30 having a mandrel 31 rigidly secured thereto. The body portion is provided with a threaded end portion 32, the threads thereof fitting the internal threads 29 of the cap nut 28. A handle 33 is passed through openings in the body portion 30 to facilitate turning of the tool. Other means for turning the tool may be provided. The mandrel 31 consists of an elongated cylindrical portion 34, having a diameter corresponding to the diameter of the bore in the nipple and to the inside diameter of the passage to the hose. The mandrel further comprises a gradually tapered leading end 35, the purpose of which will be presently described.

In applying the coupling of the present invention to the end of the hose the nipple with the cap nut 28 thereon is telescoped on the mandrel 31 and cap nut 28 is brought into threaded engagement with the threaded portion 32 of the body of the tool. The sealing surface 26 of the nipple is thus drawn into firm engagement with the wall 36 of a recess formed in the end of the body 30 of the tool. When the cap nut 28 is tightened, a firm frictional engagement between the nipple and the tool is thus provided. While frictional engagement between the tool and the nipple may be provided in the manner just described, it will be readily understood that the tool might be variously designed to permit a firm frictional engagement to be formed between the nipple and the tool when the nipple has been applied to the tool by means of the cap nut. For example, when the nipple has a relatively large diameter the mandrel may be formed so as to be expansible within the nipple to thus provide the needed frictional engagement, so that after the nipple has been disposed on the mandrel the latter may be expanded to provide the necessary firm frictional engagement between the nipple and the tool.

The socket is applied to the end of the hose by inserting the hose end in the bore and turning the socket until the end of the hose abuts against the end wall 19 of the socket. In engaging the socket with the end of the hose, the spiral rib 17 acts as a screw thread serving to advance the end of the hose gradually into the socket as the socket is turned with respect to the hose end. Inasmuch as the rib 17 protrudes inwardly from the wall of the socket, which as stated has a diameter corresponding to the outside diameter of the hose, when the socket is screwed in the end of the hose, said end is distorted in a manner shown in a somewhat exaggerated form in Figure 3, that is, the passage through the hose is somewhat contracted by the socket. It will be understood further that the rib 17 will compress or compact the hose wall from the outside of the end thereof to a certain degree.

After the socket has been screwed on the hose end in the manner described, and the nipple intended to cooperate therewith secured to the tool in the manner already stated, the parts are brought into engagement by inserting the protruding end of the mandrel which, as illustrated in Figure 4, extends substantially beyond the end edge 25 of the nipple in the end of the hose. The tapered end 35 of the mandrel engages the constricted passage through the hose and expands the passage by compressing the fibrous material of the hose wall. At the same time as the mandrel is forced into the hose end, the hose wall is forced into the spiral groove formed by the rib 17, the fibrous material of the hose wall being compacted or compressed to a greater or less degree at various points of the end of the hose. After the threaded portion 23 of the nipple engages the threaded portion 14 of the socket, the tool is turned, bringing about a threaded engagement between the socket and the nipple. The nipple must turn as a unit with its tool because of the frictional engagement between the tool and the nipple already described. As the nipple is advanced into the hose end, the tapered end portion 24 of the nipple further compresses the fibrous material constituting the hose wall, the end of the nipple forming a wedge that acts to gradually compress the fibrous material of the hose until it completely fills the space between the end of the nipple and the socket after the nipple is in its final position. It will be observed that, in such final position, the nipple preferably extends somewhat beyond the highest portion of the rib 17 of the socket, so that the zone of maximum compression exerted by the nipple and socket on the hose end is located at a point spaced substantially inwardly from the edge of the socket, this zone being designated by 38. It will be understood that the maximum clamping force on the hose end is thus applied at a point substantially spaced from the edge 18 of the socket and that the clamping pressure diminishes in both directions forwardly and rearwardly from said zone. As a consequence, when the hose is bent at the coupling, such bending can take place at a point spaced from the portion of the hose wall that is under severe stress and breaking of the hose will accordingly not occur at the coupling.

It will be observed further that, in the final position of the nipple, the thicker portion of the nipple is opposite the extreme end of the hose and that, as the nipple is forced toward this position, the extreme end of the hose is compressed and forced into the recess 20 completely filling said recess. The final position of the tool socket and nipple after assembly has been completed is illustrated in Figure 5.

After assembly has been completed, the tool is removed by unscrewing the cap nut 28 and then withdrawing the mandrel from the hose and nipple, the resultant, completed assembly being illustrated in Figure 1. The coupling of the present invention has been found of great utility in the various fluid lines used on airplanes. The coupling can be installed with a vice and a tool such as described in airports by unskilled labor, as will be obvious from the above description. It will be understood, however, that the coupling may be used with great satisfaction in other fields; for instance, in the high pressure lubricating systems of automobiles and in hydraulic brake systems in the automotive field.

The described coupling has been found to effectively resist pressures as high as 5000 pounds per square inch. The ability of the coupling to withstand such high pressures is believed to be in large part due to the fact that the coupling grips the end of the hose with so much pressure that the relatively unyielding fibrous walls of the hose are substantially compressed and compacted between the socket and nipple though the maximum pressure is exerted at a point substantially spaced inwardly of the edge of the socket, as already stated.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A hose coupling consisting of a screw-connected socket and nipple engaging the end of a hose; the socket having a bore of a maximum internal diameter substantially equal to the normal external diameter of the hose and providing a wall surrounding a substantial portion of the end of the hose and the nipple having a bore corresponding to the internal diameter of the hose and projecting into the passage through the hose from said end, the portion of the nipple projecting into said passage tapering from a maximum thickness to a thin edge, the wall of said socket defining an annular chamber with a portion of said nipple, said wall having an inwardly projecting spiral rib terminating abruptly and providing an annular shoulder, said wall beyond said shoulder in a direction away from said end being of generally cylindrical shape and snugly engaging the hose over a substantial section of its length, the tapered portion of said nipple being opposite said shoulder of the socket and opposite a portion only of said rib and the thickest portion of the nipple being opposite the wall of the socket defining said annular chamber, said nipple and said shoulder cooperating to distort the hose with a maximum pressure in a zone at and adjacent said shoulder, said distortion of the material of the hose being effected without increase of the external diameter of the gripped hose end, said rib beyond said nipple being pressed into the material of the hose.

PETER HIRSCH.